Patented Oct. 11, 1938

2,132,700

UNITED STATES PATENT OFFICE 2,132,700

METHOD OF PREPARING YEAST RAISED DOUGHS

Albert S. Richardson, Herbert S. Colth, and Verling M. Votaw, Wyoming, Ohio, assignors to The Procter & Gamble Company, Cincinnati, Ohio, a corporation of Ohio No Drawing. Application February 3, 1938, Serial No. 188,582

8 Claims. (Cl. 99—90)

Our invention relates to the production of yeast-raised doughs made from a flour base. It is the object of the invention to provide a convenient method of preparing yeast-raised doughs which can be baked into bread and related edible products of unusual tenderness and palatability. This object is accomplished by the use of superglycerinated shortening, i. e., edible fat comprising mono- and diglycerides, in the manner hereinafter set forth.

In our copending applications, Serial Numbers 655,292–655,295, inclusive, filed February 4, 1933, we have shown that the really important function of the monoglycerides and diglycerides of higher fatty acids in shortenings is to improve the quality of edible products baked from a flour base, especially the tenderness or the volume of the baked product. Insofar as mono- and diglycerides had been previously proposed for use in shortenings, they had been regarded either as stiffening agents for the shortening or as emulsifying agents to promote the incorporation of water in margarine or the like.

In the first development of real uses for superglycerinated shortening in baking practice especial attention was given to plastic shortening, since that is the form of shortening which under most conditions gives best results. Truly solid fat, such as tripalmitin or tristearin, is not readily mixed into a dough or batter in the required degree of intimacy, and most cooks and bakers find liquid shortening inferior for general use to plastic shortening. In cake baking very unsatisfactory results are obtained if the main body of shortening is liquid, although we have found that the mono- and diglyceride portion of the shortening can be satisfactorily added as liquid to the cake batter with excellent results.

To some extent the choice of superglycerinated fat for best baking results from yeast-raised doughs parallels closely the choice of superglycerinated shortening for use in cakes. In general, the tenderizing effect increases with increasing excess of combined glycerine over that required for formation of triglyceride of all the combined fatty acid of the shortening. Monoglycerides are thus more potent than diglycerides, and soft or liquid diglyceride fats are superior to hard diglycerides, the stiffness of the latter being incompatible with good mixing of the dough when the excess combined glycerine present in hard diglyceride fat is otherwise sufficient for the tenderizing effect usually desired. However, certain points of difference, which we have observed, are such as to indicate usefulness attaching to a special procedure suitable for making the improved yeast-raised doughs. These points of difference are set forth.

The chief improvement in cakes resulting from use of mono- and diglyceride is the increased volume of the finished baked product, especially when the cake is baked from a batter unusually high in sugar and aqueous ingredients. There is also an increase in the tenderness in cakes resulting from use of mono- and diglycerides, but this is of relatively minor advantage. In contrast, the primary advantage resulting from the use of superglycerinated shortening in products baked from yeast-raised doughs is increased tenderness, the volume of the baked product being very little affected.

The proportion of excess combined glycerine in the shortening required for taking full practical advantage of the increased tenderizing effect on products baked from yeast-raised doughs is greater than is needed to make an entirely satisfactory cake. Thus with .3% excess combined glycerine in the shortening, as described in our copending applications hereinabove referred to, cakes can be easily produced which any observer can recognize as much superior to the cakes made with the corresponding triglyceride shortening, and .4% excess combined glycerine is sufficient to improve the same shortening for cake work to the point where only discriminating observation will detect further improvement due to further increase in the excess combined glycerine. In contrast, the tenderizing effect of mono- and diglycerides in baked products from yeast-raised doughs is detected only by very careful observation when the excess combined glycerine in the shortening is only .3% or .4% of the total weight of fat. This tenderizing effect increases gradually with increasing proportion of the special glycerides and we find that the improvement is easily demonstrated only when the excess combined glycerine is at least about .5%. Of course, this exact percentage is not represented to be critical in comparison with a few hundredths or even one-tenth of a per cent less combined glycerine, but is a practical minimum based on many comparisons of superglycerinated shortening with triglyceride shortening in yeast-raised doughs.

In general, the desirable proportion of mono- and diglyceride fat in the shortening increases with decreasing proportion of shortening in the dough and the tenderizing effect is more marked when the proportion of sugar is greater than that required for proper yeast fermentation. Thus in typical baker's bread, containing relatively little sugar and fat, the shortening preferably contains not less than about 2% excess combined glycerine, whereas we believe that the optimum economical effect—not the maximum effect—can be obtained with less than 1% excess combined glycerine in shortening for so-called "sweet doughs", which usually contain a greater proportion of sugar and of shortening than ordinary bread dough. In any type of yeast-raised dough, the total weight of the excess of combined glycerine in the shortening is preferably not less than .1% of the weight of flour incorporated in the dough.

As mentioned above, liquid mono- and diglyceride fat may be incorporated in our improved cake batters, but the main body of shortening should be plastic. In contrast, not only the mono- and diglyceride fat but even the whole body of shortening incorporated in our improved sweet doughs may, without substantial disadvantage, be entirely liquid or so nearly liquid as to flow freely.

The foregoing comparison has been stated in considerable detail, because the present invention can best be understood by regarding it as the result of an effort to make useful application of knowledge of the whole set of facts set forth. Although without undue expense a single superglycerinated shortening can be formulated which will be satisfactory for use in cakes and in the better grades of sweet dough, the requirements of the whole range of yeast-raised doughs cannot be satisfactorily met with any one shortening. In a sense, the object of the present invention is to minimize the disadvantage resulting from the inherent need of two or more superglycerinated shortenings in bakery practice.

The essential step in our process is the incorporation of liquid or almost liquid and free flowing superglycerinated fat into the yeast-containing dough, the composition and quantity of superglycerinated fat being such that the excess of combined glycerine over that required for formation of triglyceride of all the combined fatty acid is not less than about one-half per cent of the total fat added to the dough and is sufficient to produce a tenderizing effect in the product baked from the dough after yeast fermentation. While the fluid superglycerinated fat may be the only shortening in the mix, it is ordinarily more economical to prepare a concentrate consisting principally of mono- and diglycerides, and to use this concentrate as a supplement to a conveniently available shortening either of the triglyceride type or of the type containing insufficient mono- and diglyceride for the particular yeast dough being prepared. The free flowing form of the superglycerinated fat makes it very convenient for measuring and mixing, with no sacrifice of quality in the baked goods. It is possible but not necessary to prepare the superglycerinated fat free from solid fat at room temperature; it is sufficient that the fat flow freely enough to be easily stirred, measured out, and mixed into the dough. Even a superglycerinated fat capable of being made plastic at room temperature may advantageously be used in our process after melting, with perhaps an occasional remelting. The general method of operating as just outlined enables bakers, with a minimum of different shortening materials, to have maximum flexibility in adjusting the composition of their shortening to their needs, which are inherently variable for the reasons already explained.

In general, the mono- and diglycerides employed in our process should be derived from fatty acids which are predominantly unsaturated and are principally of sixteen or higher carbon content. Cocoanut, or palm kernel or like oil, when superglycerinated, is effective in our process, but is objectionable on account of flavor and should at most constitute a minor proportion of the total special fat. The following will serve to illustrate the kind of superglycerinated fat which is suitable:

Mono-olein.

Monoglyceride of the mixed fatty acids of cottonseed oil.

Diglyceride of the mixed fatty acids of peanut oil.

Cottonseed oil hydrogenated to 65–75 iodine value and reacted with glycerine to form a mixture containing 19% combined glycerine and containing principally mono- and diglycerides. This fat should be cooled slowly so that the solid separates out in soft grains, and remelted occasionally if necessary to render fluid. Soybean oil hydrogenated to 70–80 iodine value and reacted with enough glycerine to raise the combined glycerine content to about 15%, in melted state just above room temperature.

Monoglyceride of lard fatty acids, in grainy condition at or just above room temperature.

Monoglyceride of the fatty acids of hydrogenated peanut oil of about 80 iodine value.

In the above examples, the term "monoglyceride" does not necessarily refer to a material exclusively monoglyceride, but includes synthetic fat consisting predominantly of monoglyceride. Likewise the term "diglyceride" is used in a broad sense so as to comprise a synthetic fat in which the diglyceride predominates.

Our process is applicable to a wide variety of dough formulas, falling chiefly into the two general classes of bread doughs and sweet doughs, hereinbefore referred to. Within each class of formulas, we prefer to use rather more than average moisture, but this is not at all essential to realization of the tenderizing effect of the superglycerinated fat. Since formulas for yeast-raised doughs are well known, two typical formulas will suffice for further explanation of the present invention, without discussion of the numberless possible variations except such as pertain to the shortening.

The following shows the proportions of the various ingredients in a typical sweet dough, the quantities being adjusted to yield about ten pounds of dough.

|  | Lbs. | Ozs. |
|---|---|---|
| Sugar | 1 |  |
| Shortening | 1 |  |
| Salt |  | 1 |
| Whole eggs |  | 12 |
| Skim milk | 2 | 1 |
| Yeast |  | 8 |
| Flavor | to taste |  |
| Bread flour | 3 |  |
| Cake flour | 1 | 8 |

The sugar, shortening and salt are creamed together to the desired lightness and, with continued mixing, the eggs and next the milk are premixed with the yeast and flavoring agents are added. Finally the flour is beaten into the mix until the whole is smooth. The final mixing temperature should be about 80° F. The fermentation is conducted and the gas worked out of the dough in the usual manner, and the dough finally shaped as desired for baking into rolls, tea rings, or the like.

Innumerable shortening combinations for use in such a sweet dough formula will be suggested by the principles already explained as underlying our process. For instance, 2 ounces of a fluid superglycerinated fat prepared by esterifying cottonseed oil fatty acids with one-fifth their own weight of pure glycerine may be used along with 14 ounces of a conventional plastic triglyceride shortening. Very similar results can be obtained by use of 1 ounce of the same superglycerinated cotton seed oil together with 15 ounces of a superglycerinated cake shortening containing about .4% excess combined glycerine. An equally tender baked product, with a more polished appearance of the crust, can be obtained by incorporating in the dough 1 pound of an oil prepared by mixing the same superglycerinated cottonseed oil with seven times its weight of ordinary cottonseed oil of edible grade.

On account of keeping quality, we prefer to use a partially hydrogenated and highly superglycerinated vegetable oil, examples of which have been given. Cottonseed oil is preferred for this purpose on account of availability. Negligible trouble is involved in remelting such a product often enough to maintain it in a free flowing condition in the bakery. Enough of the superglycerinated shortening is used, preferably in conjunction with a cheaper shortening, to give the desired tenderizing effect, and this ordinarily requires at least ½% excess combined glycerine in the whole of the fat added to the dough.

The same considerations regarding choice of shortening apply to bread doughs in which the sugar used is not much more than required for proper yeast fermentation. The bread doughs practically always contain less than 10% shortening, based on the weight of flour. With these must be classed also "lean" formulas for sweet dough, there being no sharp dividing line between bread doughs and sweet doughs. A typical formula is: Flour, 100 parts; sugar, 4 parts; salt, 2 parts; skim milk powder, 4 parts; yeast, 2.5 parts; water 60-70 parts; shortening, 2 parts. The flour and shortening are mixed together; the salt, sugar, and milk powder dissolved in a part of the water are next added; and finally a slurry of the yeast in the remainder of the water is added. Slow mixing of the entire mass is continued until a coherent dough is formed, and the mixing then carried out at high speed until the dough is developed to the right consistency as determined by experience. Fermentation, working out the gas, shaping the loaves, and then baking follow in the conventional manner.

Even with so little shortening in the formula as suggested in the preceding paragraph, the shortening used in our process could be two-thirds or even three-fourths ordinary triglyceride fat if the remainder consisted of practically pure mono-olein for instance. However, relatively pure mono-glycerides are not so easily prepared as superglycerinated fat mixtures containing 5 to 10% excess combined glycerine, and hence we prefer all or at least about half of the shortening in such a bread formula to consist of the fluid superglycerinated fat. With bread formulas calling for larger proportions of fat, e. g., 8% based on the weight of flour, the proportion of the ordinary triglyceride shortening may be correspondingly increased, in accordance with the general principles explained hereinbefore.

In the practice of our invention it is unnecessary and hence is usually uneconomical to prepare pure mono- or diglycerides. The composition of the required fluid superglycerinated shortening can be better controlled in terms of its combined glycerine and combined fatty acid content. We have used the term "excess combined glycerine" and explained it in a manner which will be clear to the skilled chemist, but on account of the importance of this concept it will be further explained by examples.

In determining excess combined glycerine in a fat it is convenient, although not essential, to follow the conventional practice of regarding the percentage of total combined glycerine in a fat as the ratio of the weight of glycerine obtainable from the fat to the weight of total fat. Thus in pure mono-olein, the proportion of combined glycerine is considered to be the ratio of the molecular weight of glycerine to the molecular weight of mono-olein, i. e., approximately $$\frac{92}{356}$$

or 25.8%. Since one-third as much glycerine would be required to form the triglyceride as is required to form the monoglyceride of any given weight of fatty acid, the excess of combined glycerine in pure mono-olein may be very simply calculated as two-thirds of 25.8% or 17.2%.

In the foregoing example, we have in effect regarded mono-olein as though each mol. of it consisted of one-third of a mol. of tri-olein and two-thirds of a mol. of additional or excess combined glycerine. Just so in general the composition of a mixture of mono-, di- and triglycerides can be regarded as consisting of an equivalent amount of triglyceride fat plus the excess combined glycerine. In the particular case of preparing mono- and diglycerides by reacting triglycerides with glycerine, the amount of excess combined glycerine as herein defined is exactly the same as the amount of glycerine which actually enters into the reaction. To calculate the excess combined glycerine from chemical analysis of a mixture of glycerides, it is sufficient to determine accurately the saponification number of the mixture and the total combined glycerine by conventional methods. The per cent combined glycerine required for formation of triglyceride of all the fatty acid of the fat is equal to .0547 times the saponification number of the fat, and this theoretical percentage of glycerine can be subtracted from the per cent combined glycerine as determined by analysis in order to estimate the per cent excess combined glycerine in the fat. Of course, the analyst must make suitable corrections for free fatty acid, dissolved glycerine and any other complications which he may encounter. There are independent methods of analysis which may be used to replace or to check the particular methods referred to above, and accordingly our invention is not defined in terms of any particular method of analysis.

Having thus described the invention, what is claimed as new and desired to be secured by Letters Patent is:

1. The process of preparing yeast-raised doughs from a flour base which comprises the step of incorporating in the dough fatty shortening having a free flowing consistency and containing glycerides of the group consisting of mono- and diglycerides of predominantly unsaturated higher fatty acids in quantity sufficient to produce a tenderizing effect on the edible product baked from the said dough.

2. The process of preparing doughs from a flour base which comprises incorporating in the dough yeast as a leavening agent, a triglyceride shortening, and an additional shortening agent in free flowing form containing, in amount sufficient to increase the tenderness of bread or like product baked from the said dough, predominantly unsaturated higher fatty acid esters of the group consisting of monoglycerides and diglycerides.

3. In the process of preparing products baked from a yeast-raised flour dough, the step which consists in mixing into the dough free flowing fat containing predominantly unsaturated higher fatty acid glycerides of the group consisting of mono- and diglycerides in amount sufficient to make the amount of the excess of combined glycerine over that required to form the triglyceride of the combined fatty acids of all the fat in the mix equal at least to .1% of the weight of the flour in the mix.

4. The process claimed in claim 3 in which there is incorporated into the dough more sugar than is required for yeast fermentation.

5. In the process of preparing products baked from a yeast-raised flour dough, the step which consists in mixing into the dough predominantly liquid and free flowing fat containing predominantly unsaturated higher fatty acid glycerides of the group consisting of mono- and diglycerides in amount sufficient to make the amount of the excess of combined glycerine over that required to form the triglyceride of the combined fatty acids of all the fat in the mix equal at least to .5% of the weight of all the fat.

6. In the process of preparing products baked from a yeast-raised flour dough, the step which consists in incorporating in the dough a plastic fat comprising higher fatty acid glycerides and a free flowing fat containing predominantly unsaturated higher fatty acid glycerides of the group consisting of mono- and diglycerides in amount sufficient to make the amount of the excess of combined glycerine over that required to form the triglyceride of the combined fatty acids of all the fat in the mix equal at least to .1% of the weight of the flour in the mix.

7. A method of controlling the excess combined glycerine content of shortening in yeast-raised flour doughs to produce a tenderizing effect on the edible products baked from such doughs, which includes the step of incorporating in the dough a plastic fat comprising higher fatty acid glycerides and a free flowing fat containing predominantly unsaturated higher fatty acid glycerides of the group consisting of mono- and diglycerides, said last named glycerides containing more excess combined glycerine than said first named glycerides.

8. A method of controlling the excess combined glycerine content of shortening in yeast-raised flour doughs to produce a tenderizing effect on the edible products baked from such doughs, which includes the step of incorporating in the dough a plastic fat comprising higher fatty acid glycerides and a free flowing fat containing predominantly unsaturated higher fatty acid glycerides of the group consisting of mono- and diglycerides, said last named glycerides containing more excess combined glycerine than said first named glycerides and being incorporated in amount sufficient to make the total amount of excess combined glycerine over that required to form the triglyceride of the combined fatty acids of all the fat in the mix equal at least to .5% of the weight of all the fat.

ALBERT S. RICHARDSON.
HERBERT S. COITH.
VERLING M. VOTAW.